United States Patent [19]
Toki et al.

[11] Patent Number: 6,134,091
[45] Date of Patent: Oct. 17, 2000

[54] SPIN-VALVE MAGNETO-RESISTIVE HEAD WITH HORIZONTAL TYPE STRUCTURE

[75] Inventors: Kaoru Toki; Haruo Urai; Keishi Ohashi, all of Tokyo, Japan

[73] Assignee: NEC Corporation, Japan

[21] Appl. No.: 09/174,876

[22] Filed: Oct. 16, 1998

[30] Foreign Application Priority Data

Oct. 17, 1997 [JP] Japan ................................. 9-285415

[51] Int. Cl.⁷ ....................................................... G11B 5/39
[52] U.S. Cl. ...................................................... 360/324.11
[58] Field of Search ............................. 360/113, 324.11; 338/32 R; 324/252, 207.21

[56] References Cited

U.S. PATENT DOCUMENTS

| | | | |
|---|---|---|---|
| 5,896,251 | 4/1999 | Ohsawa et al. | 360/113 |
| 5,898,549 | 4/1999 | Gill | 360/113 |
| 5,923,503 | 7/1999 | Sato et al. | 360/113 |
| 5,993,566 | 11/1999 | Lin | 360/113 X |
| 6,018,443 | 1/2000 | Watanabe et al. | 360/113 |

FOREIGN PATENT DOCUMENTS 4-358310  12/1992  Japan .
6-203340  7/1994  Japan .

*Primary Examiner*—William R. Korzuch
*Attorney, Agent, or Firm*—Hayes, Soloway, Hennessey, Grossman & Hage, P.C.

[57] ABSTRACT

An MR head in which a spin-valve device unit is formed into a horizontal shape and an anti-ferromagnetic layer is not required, is provided. The spin-valve device unit includes a first ferromagnetic layer, one and another permanent magnetic layers arranged on both end portions of the first ferromagnetic layer and creating a magnetic path from one of the end portions of the first ferromagnetic layer toward the other thereof. A second ferromagnetic layer is provided above the first ferromagnetic layer through a non-magnetic conductive layer and a soft magnetic layer is provided above the second ferromagnetic layer through a non-magnetic layer. The both end portions of the second ferromagnetic layer are designed to contact with outer end portions of the permanent magnet layers, respectively. Surfaces of the permanent magnet layers are perpendicular to the surface of a magnetic storage medium and to the magnetization direction thereof.

8 Claims, 4 Drawing Sheets

SPIN-VALVE MAGNETO-RESISTIVE HEAD WITH HORIZONTAL TYPE STRUCTURE

BACKGROUND OF THE INVENTION

1. Field of the Invention

The present invention relates to a magnetoresistive head (to be referred to simply as "MR head" hereinafter) especially for reading magnetic information written in a magnetic recording medium using a spin-valve effect.

2. Description of the Related Art

As recording densities in disk drives increase, an MR head having a high reading sensitivity has been put to practical use as a magnetic head adapted to writing and reading magnetic information with a narrow track width and high linear density. For advanced magnetic disk drives with higher recording densities, attention has been paid to an MR head using a Giant Magnetoresistive (to be referred to as "GMR" hereinafter) effect as a magnetic head having much larger sensitivity.

The GMR effect has been observed in a variety of magnetic multi-layered structures, the essential feature being at least two ferromagnetic metal layers separated by a nonferromagnetic metal layer. The physical origin is as follows: the application of an external magnetic field causes a variation in the relative orientation of the magnetizations of neighboring ferromagnetic layers. This in turn causes a change in the spin-dependent scattering of conduction electrons and thus the electrical resistance of the structure. The resistance of the structure thus changes as the relative alignment of the magnetizations of the ferromagnetic layers changes.

A particularly useful application of GMR is a spin valve structure device as disclosed in Japanese Unexamined Patent Application No.4-358310. It consists of a ferromagnetic free layer and a ferromagnetic pinned layer separated from each other by a thin spacer layer. The magnetic moment of the pinned layer is typically fixed in a direction perpendicular to the magnetic moment of the free layer under conditions of no signal field, by exchange coupling with an adjacent antiferromagnetic layer, with the magnetic moment of the free layer allowed to rotate in response to signal fields.

The resultant spin-valve response (i.e., the change in resistance) is proportional to the cosine of the angle between the direction of the magnetization in the two magnetic layers (i.e., the free layer and the pinned layer). The change in resistance of this is then proportional to $\sin \theta$, where $\theta$ is the angle of the magnetization in the free layer with respect to the longitudinal axis of the device.

It is essential for the spin-valve device of this structure, whether or not an anti-ferromagnetic layer, to enable the magnetization of the pinned layer to be completely fixed against disturbance. It is, therefore, an important challenge to select an anti-ferromagnetic layer capable of obtaining a sufficient exchange field in a stable manner.

To avoid the difficulty mentioned above, there is proposed a spin-valve device which dispenses with an additional structural means to fix the magnetization direction of a "pinned layer" as disclosed in Japanese Unexamined Patent Application No. 6-203340. FIGS. 4A through 4C illustrate the spin-valve device thereof.

As shown in FIGS. 4A through 4C, a reading head unit comprises a rectangular spin-valve device unit 119 having an underlayer 121, the first layer 122 of a ferromagnetic material, a non-magnetic metal layer 123, and a second ferromagnetic layer 124 sequentially formed above a substrate 120. The spin-valve device 119 also comprises electrical lead layers 126 and 127 provided on the upper surface of both end portions of the spin-valve device unit 119 of FIG. 4A and a bias conductor 128 (see FIG. 4A) for generating a magnetic field h parallel to the magnetic easy axes 130 of the ferromagnetic layers 122 and 124 of the spin-valve device unit 119. Electrical leads are provided to form a circuit path between the MR sensor and a current source 34 and a signal sensing means 33. In order to reduce Barkhausen noise, a longitudinal bias layer 125 is deposited over one end of the MR element remote from the ABS of the sensor.

The magnetic easy axes 130 of the above-stated ferromagnetic layers 122 and 124 are aligned along the vertical axis of the ferromagnetic layers 122 and 124 and perpendicular to the data track width w of a magnetic storage medium, respectively.

When sense current 129 is applied to the spin-valve device 119 through the electrical lead layers 126 and 127, a magnetic field is generated by the sense current 129 and the magnetic moments 131 and 132 of the ferromagnetic layers 122 and 124 are set to rotate from the easy axes 130. The rotation angles have the same value a with the opposite directions, respectively.

Both magnetic moments 131 and 132 are allowed to rotate freely in response to signal fields.

If a signal field having a sufficient magnitude is applied to the longitudinal direction of the spin-valve device 119 from a magnetic storage medium (not shown), then the magnetic moments 131 and 132 of both of the ferromagnetic layers 122 and 124 rotate at angles almost equal in magnitude and opposite in direction from the magnetic easy axes 130, respectively.

In the prior art of FIG. 4, therefore, unlike a type of a device in which the magnetization of one of the ferromagnetic layers is fixed, an additional means for fixing the magnetization direction of the "pinned layer" is not required. Besides, since the angle of magnetization direction varies two-fold, a higher output (resistive change) can be, in principle, obtained in proportion to the cosine of the angle.

In the above-stated prior-art, however, the spin-valve device 119 is provided in a longitudinal (or vertical) configuration perpendicular to the magnetic storage medium. Due to this, the characteristics according to the principle cannot be obtained in practice.

The reason is as follows. As well known, the intensity of a signal field from a magnetic storage medium attenuates (or is in inverse proportion to the square of a distance from the magnetic storage medium) as the distance become longer. As a result, the signal field with a sufficient magnitude cannot be obtained except in the neighborhood of the ABS (or Air-Bearing Surface relative to the magnetic storage medium) of the vertical-type device.

According to the prior art, the magnetization of the spin-valve device 119 rotates only in the neighborhood of the ABS and resistivity changes as well as outputs are therefore quite slight.

Although the prior art mentioned above do not disclose, the spin-valve device 119 is arranged between a pair of magnetic shield layers while predetermined insulating layers are usually provided between the device 119 and the magnetic shield layers, respectively to improve reading field resolution.

Furthermore, as the recording density increases, the recording density (or linear density) of the traveling direction of a magnetic storage medium increases. To efficiently read the signal field recorded at high linear density from the magnetic storage medium, the distance (or gap) between the spin-valve device 119 and each of the magnetic shield layers needs to be narrowed.

In the prior art stated above, the electrical lead layer 126 for applying sense current needs to be provided on the ABS side. For that reason, the distance or gap needs to be at least equal to the thickness of the electrical lead layer 126 and cannot be further narrowed.

SUMMARY OF THE INVENTION

It is therefore an object of the present invention to provide an MR head designed to overcome the disadvantages of the prior art as described above and, in particular, an MR head in which a spin-valve device is formed into a horizontal shape and an anti-ferromagnetic layer is not required, thereby increasing outputs and stabilizing the operation thereof at relatively inexpensive costs.

To attain the above object, the magneto-resistive head according to the present invention is characterized by comprising:

a spin-valve device unit having both surfaces coated with one insulating layer and another insulating layer, the resultant outer surfaces being coated with one magnetic shield layer and another magnetic shield layer, respectively; and one electrical lead layer and another electrical lead layer provided on both end portions of the spin-valve device unit, wherein the spin-valve device unit includes:

a first ferromagnetic layer provided to contact with the one insulating layer;

one permanent magnet layer and another permanent magnet layer provided to contact with both end portions of the first ferromagnetic layer, respectively, and to contact with the one insulating layer, to thereby form a magnetic path from one end portion of the first ferromagnetic layer toward the other end portion thereof;

a second ferromagnetic layer provided above the first ferromagnetic layer through a non-magnetic conductive layer to surround the first ferromagnetic layer; and a soft magnetic layer provided above the second ferromagnetic layer through a non-magnetic layer, and wherein both end portions of the second ferromagnetic layer contact with outer end portions of the one and another permanent magnet layers, respectively, and the spin-valve device unit is fixedly installed to a head main body such that surfaces of the one and another permanent magnet layers are arranged on the same surface and are perpendicular to a surface of a magnetic storage medium and to a direction of the magnetic storage medium.

According to the invention recited in claim 1, therefore, as shown in FIG. 3, by providing the adjacencies of the inner-side tip ends of the permanent magnet layers 4A and 4B magnetized in +x direction and the both end portions of the magnetic layer 5 in close proximity to one another, a magnetic field in −x direction is applied to the first ferromagnetic layer 5. By providing the outer-side both ends of the permanent magnet layers 4A and 4B and the both end portions of the second ferromagnetic layer 7 in close proximity to one another, a magnetic field opposite in direction to the first ferromagnetic layer 5 (in +x direction) is applied to the second ferromagnetic layer 7.

Moreover, the soft magnetic layer 9 is magnetized in −z direction as in the case of an SAL layer (or Soft Adjacent Layer) of the conventional MR device, by sense current Is flowing across the spin-valve device 1 via the electrical lead layers 10A and 10B. The magnetization causes a magnetic field in +x direction to be applied to the first and second ferromagnetic layers 5 and 7, respectively.

The magnetizations of the first and second ferromagnetic layers 5 and 7 are set at such angles as equal in magnitude and opposite in direction to the width direction (or z direction) of the spin-valve device 1 by the synthesis of the magnetic fields from the permanent magnet layers 4A and 4B and that from the soft magnetic layer 9 as indicated by arrows B and C. That is, the magnetizations of the two ferromagnetic layers 5 and 7 are biased by about +45° and −45° with respect to the direction of the signal field of the magnetic storage medium.

The magnetization directions B and C of the magnetic layers 5 and 7 rotate in the direction closer to the z axis direction in response to a signal field in +z direction from the magnetization of the magnetic storage medium 201, respectively. The angle between the directions B and C therefore becomes narrower.

In response to a signal field in −z direction, meanwhile, the magnetization direction B of the first magnetic layer 5 rotates in the direction closer to the direction of −x axis and the magnetization direction C of the second ferromagnetic layer 7 rotates in the direction closer to the direction of +x axis. The angle between the magnetization directions B and C therefore becomes wider.

In this case, the resistivity of the spin-valve device unit 1 changes in proportion to the cosine of the angle made between the ferromagnetic layers 5 and 7. The resistivity change is thus larger than that in case the magnetization of one of the ferromagnetic layers is fixed. As a result, the output of a reading signal increases.

A magneto-resistive head according to the present invention is characterized in that the one and another permanent magnet layers on the first ferromagnetic layer side are formed to have wedge-shaped cross-sections, respectively;

predetermined regions on both end portions of the first ferromagnetic layer are curved upward with respect to the one insulating layer according to the wedge-shaped regions of the permanent magnet layers; and the first ferromagnetic layer is provided to contact with the wedge-shaped portions of the permanent magnet layers with the wedged portions being inserted underneath the curved regions of the first ferromagnetic layer.

Owing to this, the magnetic capacity within a closed path created by the one and the other permanent magnet layers and the first and second ferromagnetic layers increases (that is, magnetic resistivity decreases). This makes it possible to make the permanent magnet layers thinner and to make the spin-valve device unit thinner accordingly. The accuracy of a reading signal improves further.

The magneto-resistive head according to the present invention is characterized in that an underlayer of one of a single-layered structure and a two-layered structure is provided on a surface of the first ferromagnetic layer on the one insulating layer side. The underlayer is preferably a single-layered structure made of Ta if the first ferromagnetic layer is made of Ni—Fe.

The underlayer is preferably a two-layered structure made of Ni—Fe and Ta if the first ferromagnetic layer is made of Ni—Fe—Co or Fe—Co.

Each of the inventions can provide not only the functions described above but also a stronger stacking structure. In this respect, the present invention can increase durability compared to the conventional case.

The magneto-resistive head according to the present invention is characterized in that underlayers are provided under the one and the other electrical lead layers, respectively.

If the two electrical lead layers are made of Au, the corresponding underlayers are preferably made of Ta or Mo. If the electrical lead layers are made of Ta, the corresponding underlayers are preferably made of W or W—Ti.

Each of the inventions, therefore, has an advantage, in addition to the above-stated functions, in improving adhesion or decreasing resistivities.

BRIEF DESCRIPTION OF THE DRAWINGS

The novel features believed characteristics of the invention are set forth in the appended claims. The invention itself, however, as well as other features and advantages thereof, will be best understood by reference to the detailed description which follows, read in conjunction with the accompanying drawings, wherein:

FIG. 4A is a partly omitted perspective schematic view during operation, FIG. 4B is an operational explanatory view thereof and FIG. 4C is a schematic view.

DETAILED DESCRIPTION OF THE PREFERRED EMBODIMENTS

One embodiment according to the present invention will be described with reference to FIGS. 1 through 3.

Figure 1:
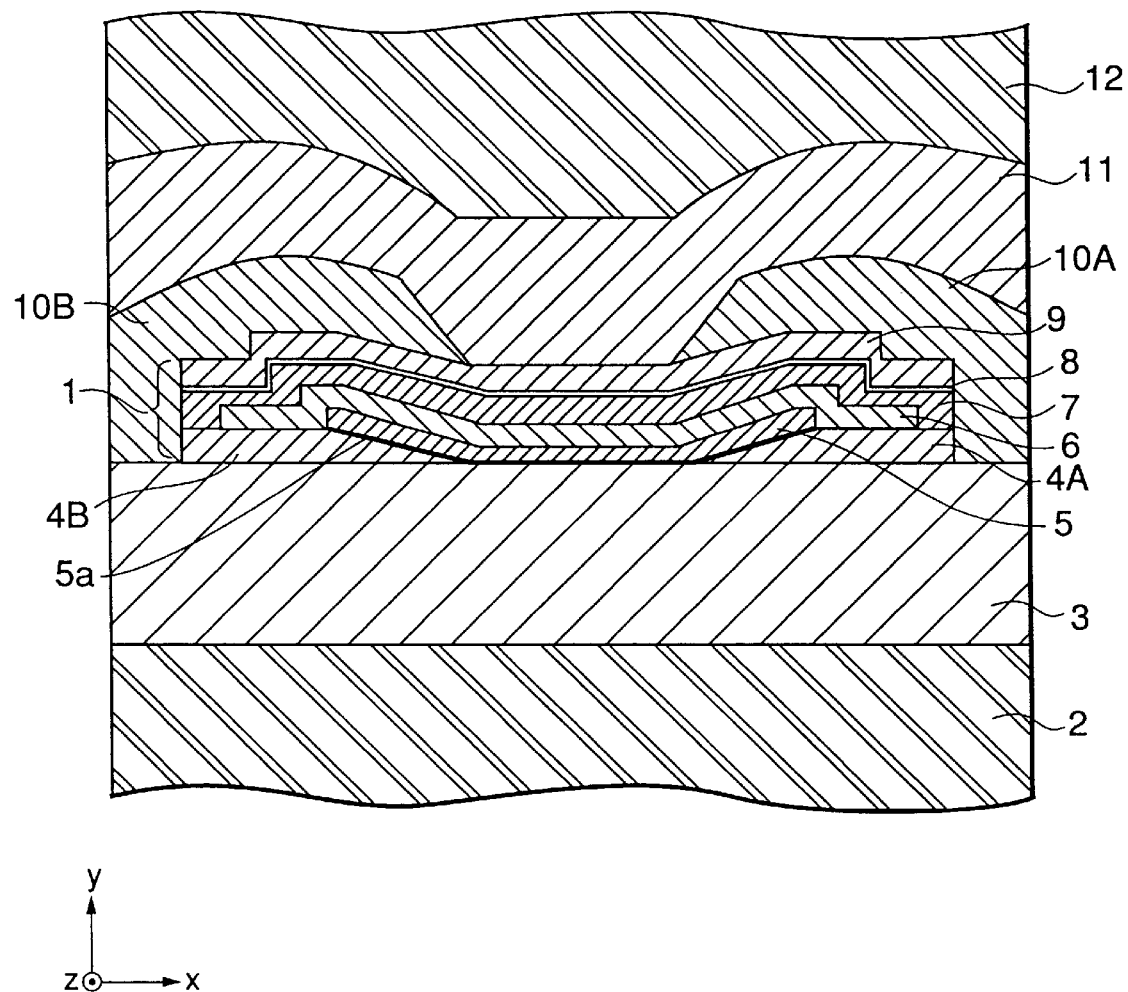
FIG. 1 is a schematic view which shows a spin-valve device in a head in one embodiment according to the present invention, seen from a magnetic storage medium (ABS) side.

FIG. 1 is a schematic view of an MR head unit provided with a spin-valve device (central active region) seen from an ABS. FIG. 2 is a perspective schematic view showing an overall composite head in case the spin-valve device in a combination with an inductive recording head is installed. FIG. 3 is a typical view showing the positional relationship between the magnetic layers of a spin-valve device and a magnetic storage medium 201 with the magnetic layers are noted.

In FIG. 1, one magnetic shield layer 2 and another magnetic shield layer 12 are provided above upper and lower surfaces of a spin-valve device unit 1 (central active region) through one insulating layer 3 and the other insulating layer 11, respectively. Specifically, the spin-valve device unit 1 is put between one insulating layer 3 and one magnetic shield layer 2, and another insulating layer 11 and another magnetic shield layer 12.

The spin-valve device unit 1 comprises two permanent magnet patterns 4A and 4B magnetized in a width direction (or X direction of FIG. 1) and arranged on the same surface with a predetermined distance kept therebetween, the first ferromagnetic layer 5 provided between the permanent magnet patterns 4A and 4B, a non-magnetic conductive layer 6 stacked on the first ferromagnetic layer 5 to cover the first ferromagnetic layer 5, a second ferromagnetic layer 7 provided on the non-magnetic conductive layer 6 to entirely cover the layer 6, and a soft magnetic layer 9 provided on the second ferromagnetic layer 7 through a non-magnetic layer 8.

The first ferromagnetic layer 5 has both end portions slightly curved with respect to the horizontal plane at, for example, about 15° upward. The wedge contact surfaces of the above-described permanent magnet patterns 4A and 4B are inserted underneath and contacted with the lower surfaces of the curved both end portions.

In this case, the first ferromagnetic layer 5 has end faces of the both end potions provided to be exposed to the upper portions of the permanent magnet patterns 4A and 4B mentioned above to thereby form stepped portions between the end faces and the upper surfaces of the permanent magnet patterns 4A and 4B. The above-stated layers (non-magnetic conductive layer 6, second ferromagnetic layer 7, non-magnetic layer 8 and soft magnetic layer 9) are sequentially coated according to the stepped portions.

The second ferromagnetic layer 7 has both end portions provided to contact with the upper surfaces of the above-stated permanent magnet patterns 4A and 4B, respectively. As for the permanent magnet patterns 4A and 4B, as shown in FIG. 3, a uniform magnetic field is formed from one permanent magnet pattern 4A to another permanent magnet pattern 4B through the first ferromagnetic layer 5.

That is to say, a closed magnetic path is created by the two permanent magnet patterns 4A and 4B and the two, i.e., first and second ferromagnetic layers 5 and 7. The soft magnetic layer 9 is further provided through the non-magnetic layer 8, thus forming the spin-valve device (or the central active region of the MR head).

Electrical lead layers 10A and 10B are provided continuously on both sides of the spin-valve device unit 1 in FIG. 1. The electrical lead layers 10A and 10B are arranged to cover the entire upper surfaces of the left and right end portions of the soft magnetic layer 9 except for the central portion on the upper surface thereof and to contact with the both end faces of the permanent magnet patterns 4A, 4B, the second ferromagnetic layer 7, the non-magnetic layer 8 and the soft magnetic layer 9, respectively. An underlayer may be provided on these electrical lead layers 10A and 10B.

In the embodiment disclosed in FIG. 1, an underlayer 5a of single-layered or two-layered structure is provided on the lower surface of the first ferromagnetic layer 5 to improve adhesion. The underlayer 5a may be also omitted.

Figure 2:
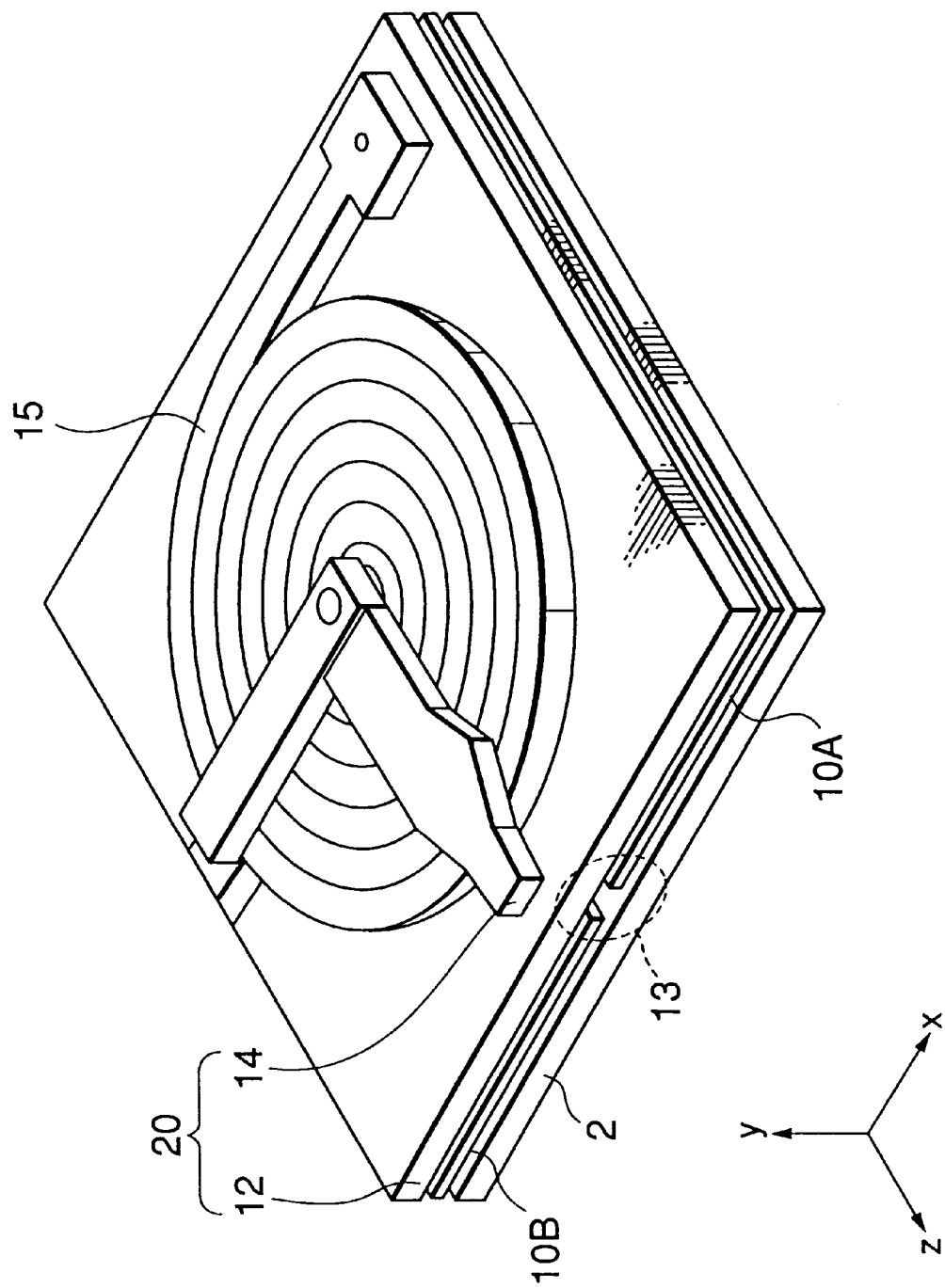
FIG. 2 is a perspective schematic view of a composite head into which the spin-valve shown in FIG. 1 is incorporated.
Figure 3:
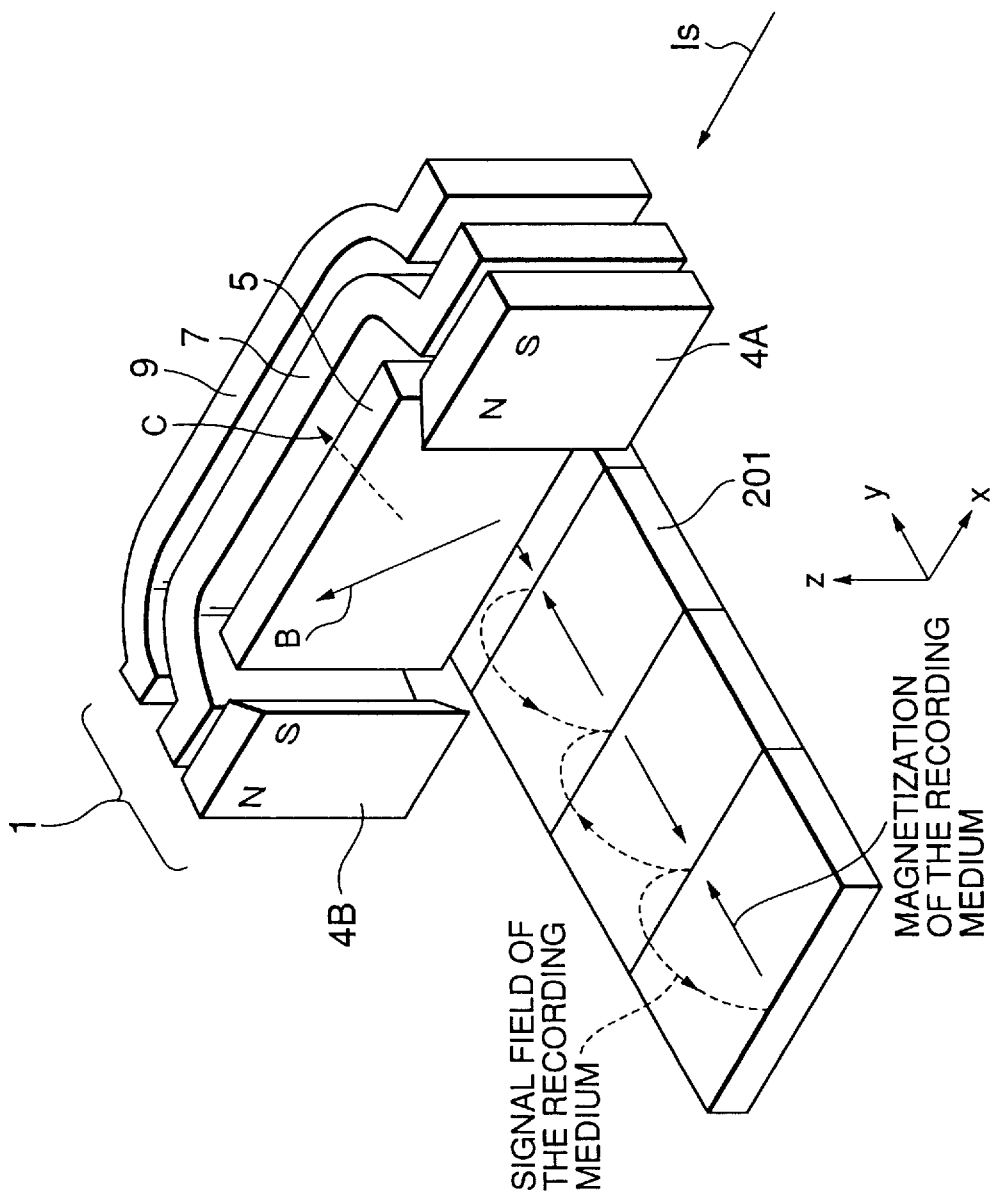
FIG. 3 is a typical view which shows the positional relationship between the noted magnetic layers of the spin-valve device shown in FIG. 1 and the magnetic storage medium.

In FIG. 2, reference numeral 13 denotes a position where the MR head unit including the above-stated spin-valve device unit 1 is installed. Reference numeral 20 denotes an inductive recording head. The inductive recording head 20 is provided with the above-stated magnetic shield layer 12 and a magnetic pole 14 with a predetermined magnetic distance from the layer 12. Reference numeral 15 denotes an exciting coil for outputting a recording magnetic signal to the gap between the magnetic pole 14 and the magnetic shield layer 12.

One and the other permanent magnet patterns (or permanent magnet layers) 4A and 4B described above are arranged on the same surface with a predetermined distance kept therebetween already mentioned above. The spin-valve device unit 1 is fixedly installed to a head main body such that the surfaces of the permanent magnet layers 4A and 4B are perpendicular to the surface and magnetization direction of the magnetic storage medium 201 (see FIG. 3).

The operation of the spin-valve device unit 1 in the above-embodiment will next be described with reference to FIG. 3.

First, by providing the adjacencies of the inner-side tip ends of the permanent magnet layers 4A and 4B magnetized in +x direction and the both end portions of the magnetic layer 5 in close proximity to one another, a magnetic field in −x direction is applied to the first ferromagnetic layer 5.

By providing the outer-side both ends of the permanent magnet layers 4A and 4B and the both end portions of the second ferromagnetic layer 7 in close proximity to one another, a magnetic field opposite in direction to the first ferromagnetic layer 5 (in +x direction) is applied to the second ferromagnetic layer 7.

Moreover, the soft magnetic layer 9 is magnetized in −z direction as in the case of an SAL layer (or Soft Adjacent Layer) of the conventional MR device, by sense current Is flowing across the spin-valve device 1 via the electrical lead layers 10A and 10B. The magnetization causes a magnetic field in +x direction to be applied to the first and second ferromagnetic layers 5 and 7, respectively.

The magnetizations of the first and second ferromagnetic layers 5 and 7 are set at such angles as equal in magnitude and opposite in direction to the width direction (or z direction) of the spin-valve device 1 by the synthesis of the magnetic fields from the permanent magnet layers 4A and 4B and that from the soft magnetic layer 9 as indicated by arrows B and C. That is, the magnetizations of the two ferromagnetic layers 5 and 7 are biased by about +45° and −45° in respect of the direction of the signal field of the magnetic storage medium such as in respect of the recording surface of the magnetic recording medium 201 (see FIG. 3).

The magnetization directions B and C of the magnetic layers 5 and 7 rotate in the direction closer to the z axis direction in response to a signal field in +z direction from the magnetization of the magnetic storage medium 201, respectively. The angle between the directions B and C therefore becomes narrower.

In response to a signal field in −z direction, meanwhile, the magnetization direction B of the first magnetic layer 5 rotates in the direction closer to the direction of −x axis and the magnetization direction C of the second ferromagnetic layer 7 rotates in the direction closer to the direction of +x axis. The angle between the magnetization directions B and C therefore becomes wider.

In this case, the resistivity of the spin-valve device unit 1 changes in proportion to the cosine of the angle made between the ferromagnetic layers 5 and 7. The resistivity change is thus larger than that in case the magnetization of one of the ferromagnetic layers is fixed.

The ferromagnetic layers 5 and 7 are made of, for example, Ni—Fe, Ni—Fe—Co or Co—Fe having a thickness between 1 and 5 [nm]. The non-magnetic layer 6 is made of Cu having a thickness between 1 and 5 [nm].

The underlayer 5a of the first ferromagnetic layer 5 is made of Ta having a thickness of several nanometers if the first ferromagnetic layer 5 is made of N—Fe. The underlayer 5a made of Ni—Fe having a thickness between 1 and 10 [nm] and a two-layered structure made of Ta having a thickness of several nanometers serving as the underlayer of the underlayer 5a are provided if the first ferromagnetic layer 5 is made of Ni—Fe—Co or Co—Fe.

The permanent magnet layers 4A and 4B are made of Co—Pt, Co—Cr—Pt or Co—Cr—Ta having a thickness between 10 and 50 [nm]. The non-magnetic layer 8 is made of Ta or Ti having a thickness of several nanometers to 10 [nm]. The soft-magnetic layer 9 is made of, for example, Co—Zr—Mo, Co—Zr, Ni—Fe—Cr, Ni—Fe—Nb or Ni—Fe—Mo having a thickness between 5 and 30 [nm].

The insulating layers 3 and 11 serving as gap layers provided below and above the spin-valve device unit 1, respectively, are made of Al2O3, Ta2O3, Si3N4, TiO2, SiO2 or the mixture thereof having a thickness between 30 and 400 [nm].

The electrical lead layers 10A and 10B are made of, for example, Au, Ta, W, Mo or the like having a thickness of 50 to 200 [nm]. Electrical lead underlayers, though not shown, are not generally required if the electrical lead layers 10A and 10B are made of W or Mo. If electrical lead layers made of Au are used, electrical lead underlayers made of Ta or Mo are used to improve adhesion. If Ta electrical lead layers are used, electrical lead underlayers made of W or WTi are used to decrease resistivities.

Figure 4A:
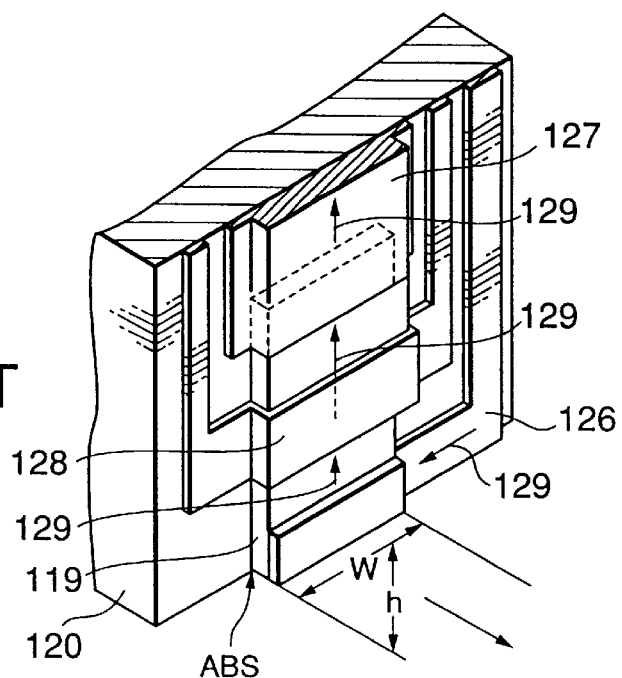
FIGS. 4A through 4C are explanatory views showing the structure and operation of a conventional vertical type MR head, where
Figure 4B:
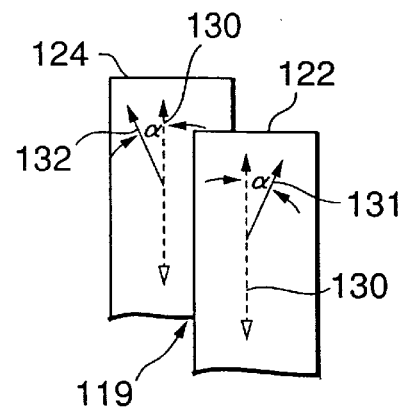
Figure 4C:
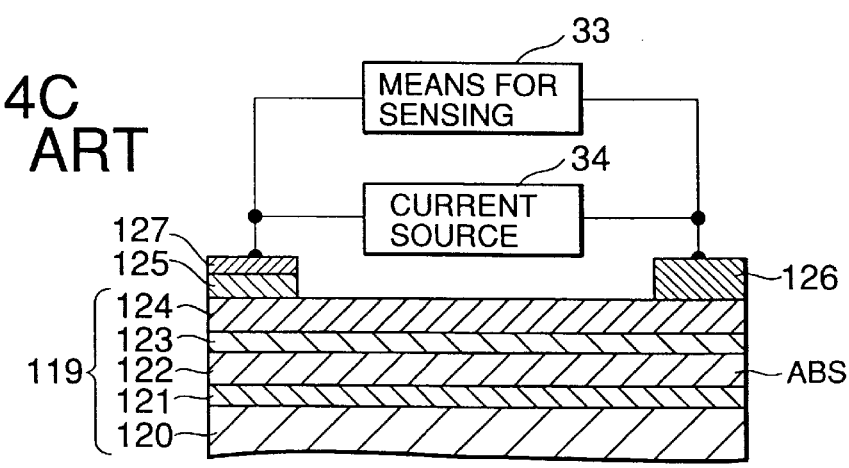

As described so far, according to the present invention, the spin-valve device is formed into horizontal shape. The present invention can therefore realize a spin-valve MR head with a (horizontal type) structure in which sense current flows in the horizontal direction of the magnetic storage medium, without providing an anti-ferromagnetic layer whose operation is unstable. Due to lack of a factor of unstable operation, the present invention can provide a spin-valve MR head which operates in a stable manner. Compared with the spin-valve MR head of the configuration shown in FIG. 4A, magnetizations B and C of the first and second magnetic layers occur in the vicinity of the medium and the angle made between the magnetization directions B and C of the spin-valve device becomes larger. As a result, higher read outputs can be advantageously obtained.

While the present invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as falls within the true scope of the invention.

What is claimed is:

1. A magneto-resistive head, comprising:
   a spin-valve device unit having both surfaces coated with one insulating layer and another insulating layer, the resultant outer surfaces being coated with one magnetic shield layer and another magnetic shield layer, respectively; and
   one electrical lead layer and another electrical lead layer provided on both end portions of said spin-valve device unit, wherein said spin-valve device unit includes:
   a first ferromagnetic layer provided to contact with said one insulating layer;
   one permanent magnet layer and another permanent magnet layer provided to contact with both end portions of said first ferromagnetic layer, respectively, and to contact with said one insulating layer, to thereby form a magnetic path from one end portion of said first ferromagnetic layer toward the other end portion thereof;
   a second ferromagnetic layer provided above said first ferromagnetic layer through a non-magnetic conductive layer to surround the first ferromagnetic layer; and
   a soft magnetic layer provided above the second ferromagnetic layer through a non-magnetic layer, and wherein both end portions of said second ferromagnetic layer contact with outer end portions of said one and said another permanent magnet layers, respectively, and said spin-valve device unit is fixedly installed to a head main body such that surfaces of the one and said another permanent magnet layers are arranged on the same surface and are perpendicular to a surface of a magnetic storage medium and to a magnetization direction of the magnetic storage medium.

2. A magneto-resistive head according to claim 1, wherein said one and another permanent magnetic layers are formed to have wedge-shaped cross-sections, respectively;

predetermined regions on both end portions of said first ferromagnetic layer are curved upward with respect to said one insulating layer according to the wedge-shaped regions of the permanent magnetic layers; and said first ferromagnetic layer is provided to contact with said wedge-shaped portions of said permanent magnet layers with said wedged portions inserted underneath the curved regions of the first ferromagnetic layer.

3. A magneto-resistive head according to claim 1, wherein an underlayer of one of a single-layered structure and a two-layered structure is provided on a surface of said first ferromagnetic layer on said one insulating layer side.

4. A magneto-resistive head according to claim 3, wherein said first ferromagnetic layer is made of Ni—Fe and said underlayer is a single-layered structure made of Ta.

5. A magneto-resistive head according to claim 3, wherein said first ferromagnetic layer is made of one of Ni—Fe—Co and Fe—Co and said underlayer is a two-layered structure made of Ni—Fe and Ta.

6. A magneto-resistive head according to claim 1, wherein underlayers are provided under said one and said another electrical lead layers, respectively.

7. A magneto-resistive head according to claim 6, wherein said one and said another electrical lead layers are made of Au and the underlayers of the electrical lead layers are made of one of Ta and Mo.

8. A magneto-resistive head according to claim 6, wherein said one and said another electrical lead layers are made of Ta and the underlayers of the electrical lead layers are made of one of W and W—Ti.

* * * * *